US010748688B2

United States Patent
Harada et al.

(10) Patent No.: US 10,748,688 B2
(45) Date of Patent: Aug. 18, 2020

(54) SOFT MAGNETIC ALLOY AND MAGNETIC DEVICE

(71) Applicant: TDK CORPORATION, Tokyo (JP)

(72) Inventors: Akihiro Harada, Tokyo (JP); Hiroyuki Matsumoto, Tokyo (JP); Kenji Horino, Tokyo (JP); Kazuhiro Yoshidome, Tokyo (JP); Akito Hasegawa, Tokyo (JP); Hajime Amano, Tokyo (JP); Kensuke Ara, Tokyo (JP); Masahito Koeda, Tokyo (JP); Seigo Tokoro, Tokyo (JP)

(73) Assignee: TDK CORPORATION, Tokyo (JP)

( * ) Notice: Subject to any disclaimer, the term of this patent is extended or adjusted under 35 U.S.C. 154(b) by 253 days.

(21) Appl. No.: 15/794,578

(22) Filed: Oct. 26, 2017

(65) Prior Publication Data

US 2018/0122543 A1 May 3, 2018

(30) Foreign Application Priority Data

Oct. 31, 2016 (JP) ................................ 2016-213583
Apr. 28, 2017 (JP) ................................ 2017-090227

(51) Int. Cl.
| | | |
|---|---|---|
| C22C 38/28 | (2006.01) | |
| H01F 1/153 | (2006.01) | |
| C22C 38/00 | (2006.01) | |
| C22C 38/26 | (2006.01) | |
| C22C 38/42 | (2006.01) | |
| B82Y 25/00 | (2011.01) | |
| C22C 38/48 | (2006.01) | |
| C22C 38/20 | (2006.01) | |
| C22C 38/32 | (2006.01) | |
| C22C 33/02 | (2006.01) | |
| C22C 45/02 | (2006.01) | |
| H01F 41/02 | (2006.01) | |

(52) U.S. Cl.
CPC .......... *H01F 1/15333* (2013.01); *B82Y 25/00* (2013.01); *C22C 33/02* (2013.01); *C22C 38/00* (2013.01); *C22C 38/005* (2013.01); *C22C 38/20* (2013.01); *C22C 38/26* (2013.01); *C22C 38/28* (2013.01); *C22C 38/32* (2013.01); *C22C 38/42* (2013.01); *C22C 38/48* (2013.01); *C22C 45/02* (2013.01); *H01F 1/15308* (2013.01); *H01F 41/0226* (2013.01)

(58) Field of Classification Search
CPC ......... B82Y 25/00; C22C 33/02; C22C 38/00; H01F 1/15308; H01F 41/0226
USPC .......................................................... 148/305
See application file for complete search history.

(56) References Cited

U.S. PATENT DOCUMENTS

| | | | | |
|---|---|---|---|---|
| 4,439,236 A | * | 3/1984 | Ray ........................ | B22F 9/007 148/334 |
| 5,474,624 A | * | 12/1995 | Suzuki .................... | C22C 45/00 148/120 |
| 2009/0266448 A1 | | 10/2009 | Ohta et al. | |
| 2011/0085931 A1 | | 4/2011 | Ohta et al. | |
| 2011/0108167 A1 | | 5/2011 | Ohta et al. | |

FOREIGN PATENT DOCUMENTS

| | | | |
|---|---|---|---|
| CN | 101263240 A | | 9/2008 |
| JP | H01-242755 A | | 9/1989 |
| JP | H04-099253 A | | 3/1992 |
| JP | H04-289151 A | | 10/1992 |
| JP | 2001295005 A | * | 10/2001 |
| JP | 3342767 B2 | | 11/2002 |
| JP | 2013-185162 A | | 9/2013 |

OTHER PUBLICATIONS

NPL: on-line translation of JP2001295005A, Oct. 2001 (Year: 2001).*

* cited by examiner

*Primary Examiner* — Jie Yang
(74) *Attorney, Agent, or Firm* — Oliff PLC

(57) ABSTRACT

A soft magnetic alloy including a composition having a formula of $((Fe_{(1-(\alpha+\beta))}X1_\alpha X2_\beta)_{(1-(a+b+d+e))}M_a B_b Cr_d Cu_e)_{1-f} C_f$, X1 is one or more elements selected from a group of Co and Ni. X2 is one or more elements selected from a group of W, Al, Mn, Ag, Zn, Sn, As, Sb, Bi, N, O, and rare earth elements. M is one or more elements selected from a group of Nb, Hf, Zr, Ta, Ti, Mo, and V. $0.030 \leq a \leq 0.14$, $0.028 \leq b \leq 0.15$, $0.005 \leq d \leq 0.020$, $0 < e \leq 0.030$, $0 \leq f \leq 0.040$, $\alpha \geq 0$, $\beta \geq 0$, and $0 \leq \alpha+\beta \leq 0.50$ are satisfied.

18 Claims, No Drawings

SOFT MAGNETIC ALLOY AND MAGNETIC DEVICE

BACKGROUND OF THE INVENTION

1. Field of the Invention

The present invention relates to a soft magnetic alloy and a magnetic device.

2. Description of the Related Art

Low power consumption and high efficiency have been demanded in electronic, information, communication equipment, and the like. Moreover, the above demands are becoming stronger for a low carbon society. Thus, reduction in energy loss and improvement in power supply efficiency are also required for power supply circuits of electronic, information, communication equipment, and the like. Then, improvement in saturation magnetic flux density and reduction in core loss (magnetic core loss) are required for the magnetic core of the ceramic element used in the power supply circuit. If the core loss is reduced, the loss of power energy is reduced, and high efficiency and energy saving are achieved.

Patent Document 1 discloses a Fe—B-M based soft magnetic amorphous alloy (M=Ti, Zr, Hf, V, Nb, Ta, Mo, and W). This soft magnetic amorphous alloy has favorable soft magnetic properties, such as a high saturation magnetic flux density, compared to a saturation magnetic flux density of a commercially available Fe based amorphous material.

Patent Document 1: JP 3342767 B

SUMMARY OF THE INVENTION

As a method of reducing the core loss of the magnetic core, it is conceivable to reduce coercivity of a magnetic material constituting the magnetic core.

However, an alloy composition of Patent Document 1 fails to contain an element capable of improving corrosion resistance, and is thereby extremely hard to be manufactured in the air. Moreover, even if the alloy composition of Patent Document 1 is manufactured by a water atomizing method or a gas atomizing method in a nitrogen atmosphere or an argon atmosphere, the alloy composition is oxidized by a small amount of oxygen in the atmosphere. This is also a problem with the alloy composition of Patent Document 1.

It is an object of the invention to provide a soft magnetic alloy or so simultaneously having a high corrosion resistance and excellent soft magnetic properties achieving all a high saturation magnetic flux density, a low coercivity, and a high permeability $\mu'$.

To achieve the above object, the soft magnetic alloy according to the present invention is a soft magnetic alloy comprising a composition having a formula of $(Fe_{(1-(\alpha+\beta))}X1_\alpha X2_\beta)_{(1-(a+b+d+e))}M_a B_b Cr_d Cu_e)_{1-f}C_f$, wherein X1 is one or more elements selected from a group of Co and Ni, X2 is one or more elements selected from a group of W, Al, Mn, Ag, Zn, Sn, As, Sb, Bi, N, O, and rare earth elements, M is one or more elements selected from a group of Nb, Hf, Zr, Ta, Ti, Mo, and V, and $0.030 \le a \le 0.14$,
$0.028 \le b \le 0.15$,
$0.005 \le d \le 0.020$,
$0 < e \le 0.030$,
$0 \le f \le 0.040$,
$\alpha \ge 0$,
$\beta \ge 0$, and
$0 \le \alpha + \beta \le 0.50$ are satisfied.

The soft magnetic alloy according to the present invention has the above-mentioned features, and thus easily has a structure to be a Fe based nanocrystalline alloy by a heat treatment. Moreover, the Fe based nanocrystalline alloy having the above-mentioned features has a high corrosion resistance. Moreover, the Fe based nanocrystalline alloy having the above-mentioned features is a soft magnetic alloy having favorable soft magnetic properties, such as a high saturation magnetic flux density, a low coercivity, and a high permeability $\mu'$.

The soft magnetic alloy according to the present invention may satisfy $0.730 \le 1-(a+b+d+e) \le 0.900$.

The soft magnetic alloy according to the present invention may satisfy $0 \le \alpha\{1-(a+b+d+e)\}(1-f) \le 0.40$.

The soft magnetic alloy according to the present invention may satisfy $\alpha=0$.

The soft magnetic alloy according to the present invention may satisfy $0 \le \beta\{1-(a+b+d+e)\}(1-f) \le 0.030$.

The soft magnetic alloy according to the present invention may satisfy $\beta=0$.

The soft magnetic alloy according to the present invention may satisfy $\alpha=\beta=0$.

The soft magnetic alloy according to the present invention may comprise a nanohetero structure composed of an amorphous phase and initial fine crystals, wherein the initial fine crystals exist in the amorphous phase.

The initial fine crystals may have an average grain size of 0.3 to 10 nm.

The soft magnetic alloy according to the present invention may comprise a structure composed of Fe based nanocrystals.

The Fe based nanocrystals may have an average grain size of 5 to 30 nm.

The soft magnetic alloy according to the present invention may comprise a ribbon shape.

The soft magnetic alloy according to the present invention may comprise a powder shape.

A magnetic device according to the present invention is composed of the above-mentioned soft magnetic alloy.

DESCRIPTION OF THE PREFERRED EMBODIMENTS

Hereinafter, an embodiment of the present invention will be described.

A soft magnetic alloy according to the present embodiment has a composition where Fe content, M content, B content, Cr content, Cu content, and C content are respectively within specific ranges. Specifically, the soft magnetic alloy according to the present embodiment is a soft magnetic alloy comprising a composition having a formula of $(Fe_{(1-(\alpha+\beta))}X1_\alpha X2_\beta)_{(1-(a+b+d+e))}M_a B_b Cr_d Cu_e)_{1-f}C_f$, wherein X1 is one or more elements selected from a group of Co and Ni, X2 is one or more elements selected from a group of W, Al, Mn, Ag, Zn, Sn, As, Sb, Bi, N, O, and rare earth elements, M is one or more elements selected from a group of Nb, Hf, Zr, Ta, Ti, Mo, and V, and $0.030 \le a \le 0.14$,
$0.028 \le b \le 0.15$,
$0.005 \le d \le 50.020$,
$0 < e \le 0.030$, $0 \le f \le 0.040$,
$\alpha \ge 0$,
$\beta \ge 0$, and
$0 \le \alpha + \beta \le 0.50$ are satisfied.

The soft magnetic alloy having the above-mentioned composition is easily configured to be a soft magnetic alloy composed of an amorphous phase and containing no crystal phase composed of crystals whose average grain size is larger than 15 nm. When this soft magnetic alloy undergoes a heat treatment, Fe based nanocrystals are deposited easily. Then, the soft magnetic alloy containing the Fe based nanocrystals easily has favorable magnetic properties. Moreover, the soft magnetic alloy easily has corrosion resistance as well.

In other words, the soft magnetic alloy having the above-mentioned composition is easily configured to be a starting material of a soft magnetic alloy where Fe based nanocrystals are deposited.

The Fe based nanocrystals are crystals whose grain size is in nano order and Fe has a crystal structure of bcc (body-centered cubic structure). In the present embodiment, Fe based nanocrystals whose average grain size is 5 to 30 nm are preferably deposited. Such a soft magnetic alloy where Fe based nanocrystals are deposited easily has a high saturation magnetic flux density, a low coercivity, and a high permeability $\mu'$. Incidentally, permeability $\mu'$ is a real part of complex permeability.

Incidentally, the soft magnetic alloy before a heat treatment may be completely composed of only an amorphous phase, but preferably comprises a nanohetero structure composed of an amorphous phase and initial fine crystals, whose grain size is 15 nm or less, wherein the initial fine crystals exist in the amorphous phase. When the soft magnetic alloy before a heat treatment has a nanohetero structure where initial fine crystals exist in amorphous phase, Fe based nanocrystals are easily deposited during a heat treatment. In the present embodiment, the initial fine crystals preferably have an average grain size of 0.3 to 10 nm.

Hereinafter, respective constituents of the soft magnetic alloy according to the present embodiment will be described in detail.

M is one or more elements selected from a group of Nb, Hf, Zr, Ta, Ti, Mo, and V. M is preferably one or more elements selected from a group of Nb, Hf, and Zr. When M is one or more elements selected from the group of Nb, Hf, and Zr, coercivity decreases easily.

A M content (a) satisfies $0.030 \le a \le 0.14$. The M content (a) is preferably $0.030 \le a \le 0.12$. When the M content (a) is small, a crystal phase composed of crystals whose grain size is larger than 15 nm is easily generated in the soft magnetic alloy before a heat treatment, no Fe based nanocrystals can be deposited by a heat treatment, coercivity is high easily, and permeability $\mu$ is low easily. When the M content (a) is large, saturation magnetic flux density is low easily.

A B content (b) satisfies $0.028 \le b \le 0.15$. When the B content (b) is small, a crystal phase composed of crystals whose grain size is larger than 15 nm is generated easily in the soft magnetic alloy before a heat treatment, no Fe based nanocrystals can be deposited by a heat treatment, coercivity is high easily, and permeability $\mu'$ is low easily. When the B content (b) is large, saturation magnetic flux density decreases easily.

A Cr content (d) satisfies $0.005 \le d \le 0.020$. When the Cr content (d) is small, corrosion resistance decreases easily.

A Cu content (e) satisfies $0 < e \le 0.030$. When Cu is contained, coercivity decreases easily. The Cu content (e) preferably satisfies $0.001 \le e \le 0.030$, and more preferably satisfies $0.005 \le e \le 0.020$. When the Cu content (e) is too large, a crystal phase composed of crystals whose grain size is larger than 15 nm is generated easily in the soft magnetic alloy before a heat treatment, no Fe based nanocrystals can be deposited by a heat treatment, coercivity is high easily, and permeability $\mu'$ is low easily.

Moreover, when both the Cr content (d) and the Cu content (e) are within the above-mentioned ranges, the soft magnetic alloy according to the present embodiment can decrease coercivity and improve permeability $\mu'$. When the Cr or Cu content (d or e) is within the above range, coercivity increases easily, and permeability $\mu'$ decreases easily.

There is no limit to a Fe content $(1-(a+b+d+e))$, but $0.730 \le 1-(a+b+d+e) \le 0.900$ is preferably satisfied. When $0.730 \le 1-(a+b+d+e)$ is satisfied, saturation magnetic flux density is improved easily, and coercivity decreases easily. When $1-(a+b+d+e) \le 0.900$ is satisfied, coercivity decreases easily.

A C content (f) satisfies $0 \le f \le 0.040$. $f=0$ may be satisfied. That is, C may not be contained. When C is contained, coercivity decreases easily, and permeability $\mu'$ improves easily. $0.001 \le f \le 0.040$ is preferably satisfied, and $0.005 \le f \le 0.030$ is more preferably satisfied. When the C content (f) is too large, a crystal phase composed of crystals whose grain size is larger than 15 nm is generated easily in the soft magnetic alloy before a heat treatment, no Fe based nanocrystals can be deposited by a heat treatment, coercivity is high easily, and permeability $\mu'$ is low easily. On the other hand, when C is not contained ($f=0$), there is an advantage that the initial fine crystals, whose grain size is 15 nm or less, are generated easily.

In the soft magnetic alloy according to the present embodiment, a part of Fe may be substituted with X1 and/or X2.

X1 is one or more elements selected from a group of Co and Ni. A X1 content ($\alpha$) may satisfy $\alpha=0$. That is, X1 may not be contained. The number of atoms of X1 is preferably 40 at % or less provided that the number of atoms of an entire composition is 100 at %. That is, $0 \le \alpha\{1-(a+b+d+e)\}(1-f) \le 0.40$ is preferably satisfied.

X2 is one or more elements selected from a group of W, Al, Mn, Ag, Zn, Sn, As, Sb, Bi, N, O, and rare earth elements. A X2 content ($\beta$) may satisfy $\beta=0$. That is, X2 may not be contained. The number of atoms of X2 is preferably 3.0 at % or less provided that the number of atoms of an entire composition is 100 at %. That is, $0 \le \beta\{1-(a+b+d+e)\}(1-f) \le 0.030$ is preferably satisfied.

The substitution amount of Fe with X1 and/or X2 is half or less of Fe based on the number of atoms. That is, $0 \le \alpha+\beta \le 50.50$ is satisfied. When $\alpha+\beta > 0.50$ is satisfied, a Fe based nanocrystalline alloy is hard to be obtained by a heat treatment.

Incidentally, the soft magnetic alloy according to the present embodiment may contain elements other than the above-mentioned elements as inevitable impurities. For example, 1 wt % or less of the inevitable impurities may be contained with respect to 100 wt % of the soft magnetic alloy.

Hereinafter, a manufacturing method of the soft magnetic alloy according to the present embodiment will be described.

The soft magnetic alloy according to the present embodiment is manufactured by any method. For example, a ribbon of the soft magnetic alloy according to the present embodiment is manufactured by a single roll method. The ribbon may be a continuous ribbon.

In the single roll method, first, pure metals of respective metal elements contained in a soft magnetic alloy finally obtained are prepared and weighed so that a composition identical to that of the soft magnetic alloy finally obtained is obtained. Then, the pure metals of each metal element are molten and mixed, and a base alloy is prepared. Incidentally, the pure metals are molten by any method. For example, the pure metals are molten by high-frequency heating after a chamber is evacuated. Incidentally, the base alloy and the Fe based nanocrystals finally obtained normally have the same composition.

Next, the prepared base alloy is heated and molten, and a molten metal is obtained. The molten metal has any temperature, and may have a temperature of 1200 to 1500° C., for example.

In the single roll method, the thickness of the ribbon to be obtained can be mainly controlled by controlling a rotating speed of a roll, but can be also controlled by controlling a distance between a nozzle and the roll, a temperature of the molten metal, or the like. The ribbon has any thickness, and may have a thickness of 5 to 30 μm, for example.

The ribbon is preferably an amorphous material containing no crystals whose grain size is larger than 15 nm at the time of a heat treatment mentioned below. The amorphous ribbon undergoes a heat treatment mentioned below, and a Fe based nanocrystalline alloy can be thereby obtained.

Incidentally, any method can be used for confirming whether the ribbon of the soft magnetic alloy before a heat treatment contains crystals whose grain size is larger than 15 nm. For example, a normal X-ray diffraction measurement can confirm an existence of crystals whose grain size is larger than 15 nm.

In the ribbon before a heat treatment, no initial fine crystals, which have a particle size of less than 15 nm, may be contained, but the initial fine crystals are preferably contained. That is, the ribbon before a heat treatment preferably has a nano hetero structure composed of an amorphous phase and the initial fine crystals existing in this amorphous phase. Incidentally, the initial fine crystals have any particle size, but preferably have an average grain size of 0.3 to 10 nm.

The existence and average grain size of the above-mentioned initial fine crystals are observed by any method, such as by obtaining a restricted visual field diffraction image, a nano beam diffraction image, a bright field image, or a high resolution image using a transmission electron microscope with respect to a sample thinned by ion milling. When using a restricted visual field diffraction image or a nano beam diffraction image, with respect to diffraction pattern, a ring-shaped diffraction is formed in case of being amorphous, and diffraction spots due to crystal structure are formed in case of being non-amorphous. When using a bright field image or a high resolution image, an existence and an average grain size of the initial fine crystals can be confirmed by visually observing the image with a magnification of $1.00\times10^5$ to $3.00\times10^5$.

The roll has any temperature and rotating speed, and the chamber has any atmosphere. The roll preferably has a temperature of 4 to 30° C. for amorphization. The faster a rotating speed of the roll is, the smaller an average grain size of the initial fine crystals is. The roll preferably has a rotating speed of 25 to 30 m/sec. for obtaining initial fine crystals whose average grain size is 0.3 to 10 nm. The chamber preferably has an air atmosphere in view of cost.

The Fe based nanocrystalline alloy is manufactured under any heat conditions. Favorable heat treatment conditions differ depending on a composition of the soft magnetic alloy. Normally, a heat treatment temperature is preferably about 400 to 600° C., and a heat treatment time is preferably about 0.5 to 10 hours, but preferable heat treatment temperature and heat treatment time may be in a range deviated from the above ranges depending on the composition. The heat treatment is carried out in any atmosphere, such as an active atmosphere of air and an inert atmosphere of Ar gas.

An average grain size of an obtained Fe based nanocrystalline alloy is calculated by any method, and can be calculated by observation using a transmission electron microscope, for example. The crystal structure of bcc (body-centered cubic structure) is also confirmed by any method, and can be confirmed using an X-ray diffraction measurement, for example.

In addition to the above-mentioned single roll method, a powder of the soft magnetic alloy according to the present embodiment is obtained by a water atomizing method or a gas atomizing method, for example. Hereinafter, a gas atomizing method will be described.

In a gas atomizing method, a molten alloy of 1200 to 1500° C. is obtained similarly to the above-mentioned single roll method. Thereafter, the molten alloy is sprayed in a chamber, and a powder is prepared.

At this time, the above-mentioned favorable nanohetero structure is obtained easily with a gas spray temperature of 4 to 30° C. and a vapor pressure of 1 hPa or less in the chamber.

After the powder is prepared by the gas atomizing method, a heat treatment is conducted at 400 to 600° C. for 0.5 to 10 minutes. This makes it possible to promote diffusion of atoms while the powder is prevented from being coarse due to sintering of each particle, reach a thermodynamic equilibrium state for a short time, remove distortion and stress, and easily obtain a Fe based soft magnetic alloy whose average grain size is 10 to 50 nm.

An embodiment of the present invention has been accordingly described, but the present invention is not limited to the above-mentioned embodiment.

The soft magnetic alloy according to the present embodiment has any shape, such as a ribbon shape and a powder shape as described above. The soft magnetic alloy according to the present embodiment may also have a block shape.

The soft magnetic alloy (Fe based nanocrystalline alloy) according to the present embodiment is used for any purpose, such as for magnetic devices, particularly magnetic cores, and can be favorably used as a magnetic core for inductors, particularly power inductors. In addition to magnetic cores, the soft magnetic alloy according to the present embodiment can be also favorably used for thin film inductors, magnetic heads, and the like.

Hereinafter, a method for obtaining a magnetic device, particularly a magnetic core and an inductor, from the soft magnetic alloy according to the preset embodiment will be described, but is not limited to the following method. In addition to inductors, the magnetic core is used for transformers, motors, and the like.

For example, a magnetic core from a ribbon-shaped soft magnetic alloy is obtained by winding or laminating the ribbon-shaped soft magnetic alloy. When a ribbon-shaped soft magnetic alloy is laminated via an insulator, a magnetic core having further improved properties can be obtained.

For example, a magnetic core from a powder-shaped soft magnetic alloy is obtained by appropriately mixing the powder-shaped soft magnetic alloy with a binder and pressing this using a die. When an oxidation treatment, an insulation coating, or the like is carried out against the surface of the powder before the mixture with the binder, resistivity is improved, and a magnetic core further suitable for high-frequency regions is obtained.

The pressing method is not limited. Examples of the pressing method include a pressing using a die and a mold pressing. There is no limit to the kind of the binder. Examples of the binder include a silicone resin. There is no limit to a mixture ratio between the soft magnetic alloy powder and the binder either. For example, 1 to 10 mass % of the binder is mixed in 100 mass % of the soft magnetic alloy powder.

For example, 100 mass % of the soft magnetic alloy powder is mixed with 1 to 5 mass % of a binder and compressively pressed using a die, and it is thereby possible to obtain a magnetic core having a space factor (powder filling rate) of 70% or more, a magnetic flux density of 0.45 T or more at the time of applying a magnetic field of $1.6 \times 10^4$ A/m, and a resistivity of 1 Ω·cm or more. These properties are equivalent to or more excellent than those of normal ferrite core magnets.

For example, 100 mass % of the soft magnetic alloy powder is mixed with 1 to 3 mass % of a binder and compressively pressed using a die under a temperature condition that is equal to or higher than a softening point of the binder, and it is thereby possible to obtain a dust core having a space factor of 80% or more, a magnetic flux density of 0.9 T or more at the time of applying a magnetic field of $1.6 \times 10^4$ A/m, and a resistivity of 0.1 Ω·cm or more. These properties are more excellent than those of normal dust cores.

Moreover, a green compact constituting the above-mentioned magnetic core undergoes a heat treatment after pressing for distortion removal. This further decreases core loss. Incidentally, core loss of the magnetic core decreases by reduction in coercivity of a magnetic material constituting the magnetic core.

An inductance product is obtained by winding a wire around the above-mentioned magnetic core. The wire is wound by any method, and the inductance product is manufactured by any method. For example, a wire is wound around a magnetic core manufactured by the above-mentioned method at least in one or more turns.

Moreover, when using soft magnetic alloy particles, there is a method of manufacturing an inductance product by pressing and integrating a magnetic material incorporating a wire coil. In this case, an inductance product corresponding to high frequencies and large current is obtained easily.

Moreover, when using soft magnetic alloy particles, an inductance product can be obtained by carrying out firing after alternately printing and laminating a soft magnetic alloy paste obtained by pasting the soft magnetic alloy particles added with a binder and a solvent and a conductor paste obtained by pasting a conductor metal for coils added with a binder and a solvent. Instead, an inductance product where a coil is incorporated into a magnetic material can be obtained by preparing a soft magnetic alloy sheet using a soft magnetic alloy paste, printing a conductor paste on the surface of the soft magnetic alloy sheet, and laminating and firing them.

Here, when an inductance product is manufactured using soft magnetic alloy particles, in view of obtaining excellent Q properties, it is preferred to use a soft magnetic alloy powder whose maximum particle size is 45 μm or less by sieve diameter and center particle size (D50) is 30 μm or less. In order to have a maximum particle size of 45 μm or less by sieve diameter, only a soft magnetic alloy powder that passes through a sieve whose mesh size is 45 μm may be used.

The larger a maximum particle size of a soft magnetic alloy powder is, the further Q values in high-frequency regions tend to decrease. In particular, when using a soft magnetic alloy powder whose maximum particle diameter is more than 45 μm by sieve diameter, Q values in high-frequency regions may decrease greatly. When Q values in high-frequency regions are not so important, however, a soft magnetic alloy powder having a large variation can be used. When a soft magnetic alloy powder having a large variation is used, cost can be reduced due to comparatively inexpensive manufacture thereof.

EXAMPLES

Hereinafter, the present invention will be described based on examples.

Raw material metals were weighed so that alloy compositions of respective examples and comparative examples shown in the following tables were obtained, and were molten by high-frequency heating. Then, a base alloy was prepared.

Then, the prepared base alloy was heated and molten to be turned into a metal in a molten state at 1300° C. This metal was thereafter sprayed by a single roll method against a roll of 20° C. with a rotating speed of 30 m/sec. in the air, and ribbons were prepared. The ribbons had a thickness of 20 to 25 μm, a width of about 15 mm, and a length of about 10 m.

Each of the obtained ribbons underwent an X-ray diffraction measurement for confirmation of existence of crystals whose grain size was larger than 15 nm. Then, it was considered that each of the ribbons was composed of an amorphous phase if there was no crystals whose grain size was larger than 15 nm, and that each of the ribbons was composed of a crystal phase if there was a crystal whose grain size was larger than 15 nm.

Thereafter, the ribbon of each example and comparative example underwent a heat treatment with conditions shown in the following tables. Each of the ribbons after the heat treatment was measured with respect to saturation magnetic flux density and coercivity. The saturation magnetic flux density (Bs) was measured using a vibrating sample magnetometer (VSM) in a magnetic field of 1000 kA/m. The coercivity (Hc) was measured using a DC-BH tracer in a magnetic field of 5 kA/m. Permeability (μ') was measured using an impedance analyzer at a frequency of 1 kHz. In the present examples, a saturation magnetic flux density of 1.20 T or more was considered to be favorable, and a saturation magnetic flux density of 1.40 T or more was considered to be more favorable. In the present examples, a coercivity of 3.0 A/m or less was considered to be favorable, a coercivity of 2.5 A/m or less was considered to be more favorable, and a coercivity of 1.6 A/m or less was considered to be the most favorable. In the present examples, a permeability μ' of 40000 or more was considered to be favorable, and a permeability μ' of 50000 or more was considered to be more favorable.

Moreover, the ribbon of each example and comparative example underwent a constant temperature and humidity test, and was evaluated with respect to corrosion resistance and observed how many hours no corrosion was generated with conditions of a temperature of 80° C. and a humidity of 85% RH. In the present examples, 20 hours or more were considered to be favorable.

Incidentally, unless otherwise stated, it was confirmed by observation using an X-ray diffraction measurement and a transmission electron microscope that all examples shown below had Fe based nanocrystals whose average grain size was 5 to 30 nm and crystal structure was bcc.

TABLE 1

$(Fe_{(1-(a+b+d+e))}M_a B_b Cr_d Cu_e)_{1-f} C_f$ ($\alpha = \beta = 0$)

| Sample No. | Fe | Nb / Hf / Zr a | B b | Cr d | Cu e | C f | XRD | Constant temperature and humidity test 80° C. × 85 RH/h (h) | Bs (T) | Hc (A/m) | µ' (1 kHz) |
|---|---|---|---|---|---|---|---|---|---|---|---|
| Comp. Ex. 1 | 0.760 | 0.140 0.000 0.000 | 0.100 | 0.000 | 0.000 | 0.000 | amorphous phase | 3 | 1.42 | 8.8 | 30700 |
| Comp. Ex. 2 | 0.830 | 0.070 0.000 0.000 | 0.100 | 0.000 | 0.000 | 0.000 | amorphous phase | 5 | 1.46 | 8.3 | 31200 |
| Comp. Ex. 3 | 0.870 | 0.030 0.000 0.000 | 0.100 | 0.000 | 0.000 | 0.000 | amorphous phase | 2 | 1.53 | 7.7 | 35100 |
| Comp. Ex. 4 | 0.730 | 0.070 0.000 0.000 | 0.200 | 0.000 | 0.000 | 0.000 | amorphous phase | 4 | 1.39 | 7.5 | 33700 |
| Comp. Ex. 5 | 0.900 | 0.070 0.000 0.000 | 0.030 | 0.000 | 0.000 | 0.000 | amorphous phase | 4 | 1.59 | 8.0 | 32600 |
| Comp. Ex. 5a | 0.728 | 0.070 0.000 0.000 | 0.200 | 0.001 | 0.001 | 0.000 | amorphous phase | 21 | 1.27 | 2.7 | 36900 |
| Example 6 | 0.730 | 0.140 0.000 0.000 | 0.100 | 0.015 | 0.015 | 0.000 | amorphous phase | 40 | 1.33 | 2.5 | 45200 |
| Example 7 | 0.800 | 0.070 0.000 0.000 | 0.100 | 0.015 | 0.015 | 0.000 | amorphous phase | 39 | 1.44 | 2.3 | 46800 |
| Example 8 | 0.840 | 0.030 0.000 0.000 | 0.100 | 0.015 | 0.015 | 0.000 | amorphous phase | 39 | 1.49 | 2.3 | 47500 |
| Comp. Ex. 5b | 0.700 | 0.070 0.000 0.000 | 0.200 | 0.015 | 0.015 | 0.000 | amorphous phase | 37 | 1.22 | 2.8 | 35700 |
| Example 10 | 0.870 | 0.070 0.000 0.000 | 0.030 | 0.015 | 0.015 | 0.000 | amorphous phase | 38 | 1.60 | 2.2 | 48500 |

TABLE 2

$(Fe_{(1-(a+b+d+e))}M_a B_b Cr_d Cu_e)_{1-f} C_f$ ($\alpha = \beta = 0$)

| Sample No. | Fe | Nb / Hf / Zr a | B b | Cr d | Cu e | C f | XRD | Constant temperature and humidity test 80° C. × 85 RH/h (h) | Bs (T) | Hc (A/m) | µ' (1 kHz) |
|---|---|---|---|---|---|---|---|---|---|---|---|
| Example 11 | 0.720 | 0.110 0.000 0.000 | 0.140 | 0.010 | 0.020 | 0.000 | amorphous phase | 37 | 1.36 | 2.9 | 40900 |
| Example 12 | 0.730 | 0.100 0.000 0.000 | 0.140 | 0.010 | 0.020 | 0.000 | amorphous phase | 36 | 1.40 | 2.3 | 47100 |
| Example 13 | 0.900 | 0.050 0.000 0.000 | 0.035 | 0.005 | 0.010 | 0.000 | amorphous phase | 35 | 1.66 | 2.3 | 48300 |
| Example 14 | 0.910 | 0.045 0.000 0.000 | 0.030 | 0.005 | 0.010 | 0.000 | amorphous phase | 35 | 1.68 | 2.8 | 42300 |

TABLE 3

$(Fe_{(1-(a+b+d+e))}M_a B_b Cr_d Cu_e)_{1-f} C_f$ ($\alpha = \beta = 0$)

| Sample No. | Fe | Nb / Hf / Zr a | B b | Cr d | Cu e | C f | XRD | Constant temperature and humidity test 80° C. × 85 RH/h (h) | Bs (T) | Hc (A/m) | µ' (1 kHz) |
|---|---|---|---|---|---|---|---|---|---|---|---|
| Comp. Ex. 6 | 0.735 | 0.150 0.000 0.000 | 0.100 | 0.005 | 0.010 | 0.000 | amorphous phase | 36 | 1.16 | 2.5 | 45100 |
| Example 15 | 0.745 | 0.140 0.000 0.000 | 0.100 | 0.005 | 0.010 | 0.000 | amorphous phase | 37 | 1.25 | 2.4 | 45900 |
| Example 16 | 0.765 | 0.120 0.000 0.000 | 0.100 | 0.005 | 0.010 | 0.000 | amorphous phase | 35 | 1.40 | 2.1 | 47600 |
| Example 17 | 0.785 | 0.100 0.000 0.000 | 0.100 | 0.005 | 0.010 | 0.000 | amorphous phase | 33 | 1.42 | 2.1 | 48100 |
| Example 18 | 0.815 | 0.070 0.000 0.000 | 0.100 | 0.005 | 0.010 | 0.000 | amorphous phase | 31 | 1.47 | 2.0 | 49000 |

TABLE 3-continued $(Fe_{(1-(a+b+d+e))}M_a B_b Cr_d Cu_e)_{1-f}C_f$ ($\alpha = \beta = 0$)

| Sample No. | Fe | Nb a | Hf a | Zr a | B b | Cr d | Cu e | C f | XRD | Constant temperature and humidity test 80° C. × 85 RH/h (h) | Bs (T) | Hc (A/m) | μ' (1 kHz) |
|---|---|---|---|---|---|---|---|---|---|---|---|---|---|
| Example 19 | 0.835 | 0.050 | 0.000 | 0.000 | 0.100 | 0.005 | 0.010 | 0.000 | amorphous phase | 29 | 1.58 | 2.0 | 49400 |
| Example 20 | 0.855 | 0.030 | 0.000 | 0.000 | 0.100 | 0.005 | 0.010 | 0.000 | amorphous phase | 26 | 1.63 | 2.0 | 49600 |
| Comp. Ex. 7 | 0.865 | 0.020 | 0.000 | 0.000 | 0.100 | 0.005 | 0.010 | 0.000 | crystalline | 23 | 1.51 | 216 | 833 |

TABLE 4

$(Fe_{(1-(a+b+d+e))}M_a B_b Cr_d Cu_e)_{1-f}C_f$ ($\alpha = \beta = 0$)

| Sample No. | Fe | Nb a | Hf a | Zr a | B b | Cr d | Cu e | C f | XRD | Constant temperature and humidity test 80° C. × 85 RH/h (h) | Bs (T) | Hc (A/m) | μ' (1 kHz) |
|---|---|---|---|---|---|---|---|---|---|---|---|---|---|
| Example 21 | 0.745 | 0.000 | 0.140 | 0.000 | 0.100 | 0.005 | 0.010 | 0.000 | amorphous phase | 34 | 1.31 | 2.4 | 45600 |
| Example 22 | 0.745 | 0.000 | 0.000 | 0.140 | 0.100 | 0.005 | 0.010 | 0.000 | amorphous phase | 35 | 1.27 | 2.5 | 45300 |
| Example 23 | 0.815 | 0.000 | 0.070 | 0.000 | 0.100 | 0.005 | 0.010 | 0.000 | amorphous phase | 32 | 1.52 | 2.2 | 47700 |
| Example 24 | 0.815 | 0.000 | 0.000 | 0.070 | 0.100 | 0.005 | 0.010 | 0.000 | amorphous phase | 32 | 1.50 | 2.2 | 48200 |
| Example 25 | 0.855 | 0.000 | 0.030 | 0.000 | 0.100 | 0.005 | 0.010 | 0.000 | amorphous phase | 28 | 1.57 | 2.0 | 49200 |
| Example 26 | 0.855 | 0.000 | 0.000 | 0.030 | 0.100 | 0.005 | 0.010 | 0.000 | amorphous phase | 30 | 1.54 | 2.1 | 48900 |
| Example 27 | 0.745 | 0.070 | 0.070 | 0.000 | 0.100 | 0.005 | 0.010 | 0.000 | amorphous phase | 33 | 1.30 | 2.5 | 45000 |
| Example 28 | 0.745 | 0.000 | 0.070 | 0.070 | 0.100 | 0.005 | 0.010 | 0.000 | amorphous phase | 33 | 1.27 | 2.4 | 45100 |
| Example 29 | 0.745 | 0.070 | 0.000 | 0.070 | 0.100 | 0.005 | 0.010 | 0.000 | amorphous phase | 36 | 1.33 | 2.4 | 45700 |
| Example 30 | 0.855 | 0.015 | 0.015 | 0.000 | 0.100 | 0.005 | 0.010 | 0.000 | amorphous phase | 31 | 1.53 | 2.1 | 49200 |
| Example 31 | 0.855 | 0.000 | 0.015 | 0.015 | 0.100 | 0.005 | 0.010 | 0.000 | amorphous phase | 26 | 1.50 | 2.3 | 48800 |
| Example 32 | 0.855 | 0.015 | 0.000 | 0.015 | 0.100 | 0.005 | 0.010 | 0.000 | amorphous phase | 27 | 1.55 | 2.0 | 49100 |
| Example 33 | 0.745 | 0.060 | 0.040 | 0.040 | 0.100 | 0.005 | 0.010 | 0.000 | amorphous phase | 35 | 1.29 | 2.4 | 46000 |
| Example 34 | 0.855 | 0.010 | 0.010 | 0.010 | 0.100 | 0.005 | 0.010 | 0.000 | amorphous phase | 23 | 1.53 | 2.1 | 49400 |

TABLE 5

$(Fe_{(1-(a+b+d+e))}M_a B_b Cr_d Cu_e)_{1-f}C_f$ ($\alpha = \beta = 0$)

| Sample No. | Fe | Nb a | Hf a | Zr a | B b | Cr d | Cu e | C f | XRD | Constant temperature and humidity test 80° C. × 85 RH/h (h) | Bs (T) | Hc (A/m) | μ' (1 kHz) |
|---|---|---|---|---|---|---|---|---|---|---|---|---|---|
| Comp. Ex. 8 | 0.730 | 0.040 | 0.000 | 0.000 | 0.220 | 0.005 | 0.005 | 0.000 | amorphous phase | 35 | 1.18 | 2.9 | 34300 |
| Comp. Ex. 8a | 0.730 | 0.055 | 0.000 | 0.000 | 0.200 | 0.005 | 0.010 | 0.000 | amorphous phase | 37 | 1.25 | 2.5 | 35700 |
| Comp. Ex. 8b | 0.740 | 0.070 | 0.000 | 0.000 | 0.175 | 0.005 | 0.010 | 0.000 | amorphous phase | 36 | 1.28 | 2.4 | 38200 |
| Comp. Ex. 8c | 0.755 | 0.070 | 0.000 | 0.000 | 0.160 | 0.005 | 0.010 | 0.000 | amorphous phase | 36 | 1.29 | 2.5 | 39700 |

TABLE 5-continued (Fe (1-(a + b + d + e)) MaBbCrdCue)1-fCf (α = β = O)

| Sample No. | Fe | Nb Hf Zr a | B b | Cr d | Cu e | C f | XRD | Constant temperature and humidity test 80° C. × 85 RH/h (h) | Bs (T) | Hc (A/m) | μ' (1 kHz) |
|---|---|---|---|---|---|---|---|---|---|---|---|
| Example 37 | 0.765 | 0.070 0.000 0.000 | 0.150 | 0.005 | 0.010 | 0.000 | amorphous phase | 36 | 1.40 | 2.3 | 47700 |
| Example 38 | 0.790 | 0.070 0.000 0.000 | 0.125 | 0.005 | 0.010 | 0.000 | amorphous phase | 35 | 1.42 | 2.1 | 48900 |
| Example 18 | 0.815 | 0.070 0.000 0.000 | 0.100 | 0.005 | 0.010 | 0.000 | amorphous phase | 31 | 1.47 | 2.0 | 49000 |
| Example 39 | 0.845 | 0.070 0.000 0.000 | 0.070 | 0.005 | 0.010 | 0.000 | amorphous phase | 33 | 1.55 | 2.0 | 49500 |
| Example 40 | 0.865 | 0.070 0.000 0.000 | 0.050 | 0.005 | 0.010 | 0.000 | amorphous phase | 30 | 1.59 | 2.0 | 49800 |
| Example 41 | 0.887 | 0.070 0.000 0.000 | 0.028 | 0.005 | 0.010 | 0.000 | amorphous phase | 25 | 1.61 | 2.3 | 48000 |
| Comp. Ex. 9 | 0.895 | 0.070 0.000 0.000 | 0.020 | 0.005 | 0.010 | 0.000 | crystalline | 21 | 1.43 | 222 | 765 |

TABLE 6

(Fe (1-(a + b + d + e)) MaBbCrdCue)1-fCf (α = β = O)

| Sample No. | Fe | Nb Hf Zr a | B b | Cr d | Cu e | C f | XRD | Constant temperature and humidity test 80° C. × 85 RH/h (h) | Bs (T) | Hc (A/m) | μ' (1 kHz) |
|---|---|---|---|---|---|---|---|---|---|---|---|
| Comp. Ex. 10 | 0.793 | 0.070 0.000 0.000 | 0.100 | 0.005 | 0.032 | 0.000 | crystalline | 33 | 1.31 | 330 | 422 |
| Example 42 | 0.795 | 0.070 0.000 0.000 | 0.100 | 0.005 | 0.030 | 0.000 | amorphous phase | 38 | 1.38 | 2.5 | 46800 |
| Example 43 | 0.805 | 0.070 0.000 0.000 | 0.100 | 0.005 | 0.020 | 0.000 | amorphous phase | 37 | 1.44 | 2.1 | 48900 |
| Example 44 | 0.810 | 0.070 0.000 0.000 | 0.100 | 0.005 | 0.015 | 0.000 | amorphous phase | 35 | 1.44 | 2.2 | 47800 |
| Example 18 | 0.815 | 0.070 0.000 0.000 | 0.100 | 0.005 | 0.010 | 0.000 | amorphous phase | 31 | 1.47 | 2.0 | 49000 |
| Example 45 | 0.820 | 0.070 0.000 0.000 | 0.100 | 0.005 | 0.005 | 0.000 | amorphous phase | 33 | 1.45 | 2.3 | 47100 |
| Example 46 | 0.824 | 0.070 0.000 0.000 | 0.100 | 0.005 | 0.001 | 0.000 | amorphous phase | 31 | 1.46 | 2.5 | 45500 |
| Comp. Ex. 11 | 0.825 | 0.070 0.000 0.000 | 0.100 | 0.005 | 0.000 | 0.000 | amorphous phase | 30 | 1.47 | 7.4 | 31300 |

TABLE 7

(Fe (1-(a + b + d + e)) MaBbCrdCue)1-fCf (α = β = O)

| Sample No. | Fe | Nb Hf Zr a | B b | Cr d | Cu e | C f | XRD | Constant temperature and humidity test 80° C. × 85 RH/h (h) | Bs (T) | Hc (A/m) | μ' (1 kHz) |
|---|---|---|---|---|---|---|---|---|---|---|---|
| Comp. Ex. 12a | 0.780 | 0.120 0.000 0.000 | 0.060 | 0.030 | 0.010 | 0.000 | amorphous phase | 38 | 1.40 | 3.9 | 30800 |
| Comp. Ex. 12b | 0.790 | 0.070 0.000 0.000 | 0.100 | 0.030 | 0.010 | 0.000 | amorphous phase | 38 | 1.43 | 3.5 | 32100 |
| Example 48 | 0.800 | 0.070 0.000 0.000 | 0.100 | 0.020 | 0.010 | 0.000 | amorphous phase | 37 | 1.50 | 2.2 | 48600 |
| Example 49 | 0.810 | 0.070 0.000 0.000 | 0.100 | 0.010 | 0.010 | 0.000 | amorphous phase | 33 | 1.52 | 2.1 | 49200 |
| Example 18 | 0.815 | 0.070 0.000 0.000 | 0.100 | 0.005 | 0.010 | 0.000 | amorphous phase | 31 | 1.47 | 2.0 | 49000 |
| Comp. Ex. 13 | 0.820 | 0.070 0.000 0.000 | 0.100 | 0.000 | 0.010 | 0.000 | amorphous phase | 3 | 1.46 | 3.3 | 33700 |

TABLE 8

$(Fe_{(1-(a+b+d+e))}M_aB_bCr_dCu_e)_{1-f}C_f$ ($\alpha = \beta = 0$)

| Sample No. | Fe | Nb / Hf / Zr a | B b | Cr d | Cu e | C f | XRD | Constant temperature and humidity test 80° C. × 85 RH/h (h) | Bs (T) | Hc (A/m) | μ' (1 kHz) |
|---|---|---|---|---|---|---|---|---|---|---|---|
| Comp. Ex. 14 | 0.815 | 0.070  0.000  0.000 | 0.100 | 0.005 | 0.010 | 0.045 | crystalline | 31 | 1.39 | 186 | 807 |
| Example 51 | 0.815 | 0.070  0.000  0.000 | 0.100 | 0.005 | 0.010 | 0.040 | amorphous phase | 35 | 1.41 | 1.8 | 50200 |
| Example 52 | 0.815 | 0.070  0.000  0.000 | 0.100 | 0.005 | 0.010 | 0.030 | amorphous phase | 33 | 1.45 | 1.2 | 57300 |
| Example 53 | 0.815 | 0.070  0.000  0.000 | 0.100 | 0.005 | 0.010 | 0.010 | amorphous phase | 33 | 1.46 | 1.4 | 55900 |
| Example 54 | 0.815 | 0.070  0.000  0.000 | 0.100 | 0.005 | 0.010 | 0.005 | amorphous phase | 32 | 1.48 | 1.6 | 53700 |
| Example 55 | 0.815 | 0.070  0.000  0.000 | 0.100 | 0.005 | 0.010 | 0.005 | amorphous phase | 31 | 1.47 | 1.8 | 50700 |
| Example 18 | 0.815 | 0.070  0.000  0.000 | 0.100 | 0.005 | 0.010 | 0.001 | amorphous phase | 31 | 1.47 | 2.0 | 49000 |
| Example 56 | 0.735 | 0.100  0.000  0.000 | 0.140 | 0.015 | 0.010 | 0.000 | amorphous phase | 39 | 1.40 | 1.6 | 52900 |
| Example 57 | 0.890 | 0.060  0.000  0.000 | 0.040 | 0.005 | 0.005 | 0.005 | amorphous phase | 30 | 1.71 | 1.6 | 55100 |
| Example 58 | 0.740 | 0.140  0.000  0.000 | 0.100 | 0.010 | 0.010 | 0.030 | amorphous phase | 35 | 1.41 | 1.2 | 57000 |
| Example 59 | 0.900 | 0.060  0.000  0.000 | 0.030 | 0.005 | 0.005 | 0.030 | amorphous phase | 27 | 1.73 | 1.3 | 56400 |

TABLE 9

$(Fe_{(1-(\alpha+\beta))}X1_\alpha X2_\beta)$ (a to f are identical to those of Example 18)

| Sample No. | X1 Kind | α(1-(a+b+d+e))(1-f) | X2 Kind | β(1-(a+b+d+e))(1-f) | XRD | Constant temperature and humidity test 80° C. × 85 RH/h (h) | Bs (T) | Hc (A/m) | μ' (1 kHz) |
|---|---|---|---|---|---|---|---|---|---|
| Example 18 | — | 0.000 | — | 0.000 | amorphous phase | 31 | 1.47 | 2.0 | 49000 |
| Example 60 | Co | 0.010 | — | 0.000 | amorphous phase | 31 | 1.48 | 2.2 | 46900 |
| Example 61 | Co | 0.100 | — | 0.000 | amorphous phase | 33 | 1.50 | 2.2 | 47100 |
| Example 62 | Co | 0.400 | — | 0.000 | amorphous phase | 35 | 1.52 | 2.3 | 46600 |
| Example 63 | Ni | 0.010 | — | 0.000 | amorphous phase | 33 | 1.47 | 2.0 | 49200 |
| Example 64 | Ni | 0.100 | — | 0.000 | amorphous phase | 34 | 1.47 | 2.0 | 49600 |
| Example 65 | Ni | 0.400 | — | 0.000 | amorphous phase | 36 | 1.46 | 2.2 | 48600 |
| Example 66 | — | 0.000 | W | 0.030 | amorphous phase | 28 | 1.45 | 2.1 | 48200 |
| Example 67 | — | 0.000 | Al | 0.030 | amorphous phase | 33 | 1.47 | 2.2 | 47400 |
| Example 68 | — | 0.000 | Mn | 0.030 | amorphous phase | 32 | 1.44 | 2.3 | 45900 |
| Example 69 | — | 0.000 | Sn | 0.030 | amorphous phase | 32 | 1.42 | 2.2 | 47100 |
| Example 70 | — | 0.000 | Bi | 0.030 | amorphous phase | 26 | 1.41 | 2.3 | 45300 |
| Example 71 | — | 0.000 | Y | 0.030 | amorphous phase | 29 | 1.46 | 2.1 | 47900 |
| Example 72 | Co | 0.100 | W | 0.030 | amorphous phase | 30 | 1.48 | 2.2 | 46200 |

TABLE 10 a to f, α, and β are identical to those of Example 18

| Sample No. | Roll rotating speed (m/sec.) | Heat treatment temperature (° C.) | Average grain size of initial fine crystals (nm) | Average grain size of Fe based nanocrystalline alloy (nm) | XRD | Constant temperature and humidity test 80° C. × 85 RH/h (h) | Bs (T) | Hc (A/m) | μ' (1 kHz) |
|---|---|---|---|---|---|---|---|---|---|
| Example 73 | 45 | 450 | No initial fine crystals | 3 | amorphous phase | 33 | 1.40 | 2.2 | 46700 |
| Example 74 | 40 | 400 | 0.1 | 3 | amorphous phase | 31 | 1.45 | 2.0 | 48500 |
| Example 75 | 30 | 450 | 0.3 | 5 | amorphous phase | 30 | 1.46 | 2.1 | 48800 |
| Example 76 | 30 | 500 | 0.3 | 10 | amorphous phase | 32 | 1.44 | 2.0 | 49200 |
| Example 18 | 30 | 550 | 0.3 | 13 | amorphous phase | 31 | 1.47 | 2.0 | 49000 |
| Example 77 | 25 | 550 | 10.0 | 20 | amorphous phase | 33 | 1.47 | 2.2 | 47300 |
| Example 78 | 25 | 600 | 10.0 | 30 | amorphous phase | 32 | 1.48 | 2.3 | 45900 |
| Example 79 | 20 | 650 | 15.0 | 50 | amorphous phase | 34 | 1.48 | 2.5 | 45200 |

Table 1 shows examples and comparative examples where B content (b), Cr content (d), and Cu content (e) were changed, and Nb content (a) was changed provided that M was only Nb.

An example whose each component was in a predetermined range had a favorable constant temperature and humidity test result. Such an example also had favorable saturation magnetic flux density, coercivity, and permeability μ'.

On the other hand, comparative examples satisfying d=0 and e=0 (Comparative Examples 1 to 5) had an unfavorable constant temperature and humidity test result, an increased coercivity, and a decreased permeability μ'. Comparative examples satisfying b=0.200 (Comparative Examples 5a and 5b) had a decreased permeability μ'.

Table 2 shows examples where B content (b), Cr content (d), and Cu content (e) were changed so that Fe content was changed, and Nb content (a) was changed provided that M was only Nb.

An example whose each component was in a predetermined range had a favorable constant temperature and humidity test result. Such an example also had favorable saturation magnetic flux density, coercivity, and permeability μ'.

An example whose 1−(a+b+d+e) was within a range of 0.730 to 0.900 had a coercivity of 2.5 A/m or less, which was more favorable.

Table 3 shows examples and comparative examples where Nb content (a) was changed provided that M was only Nb.

An example whose each component was in a predetermined range had a favorable constant temperature and humidity test result. Such an example also had favorable saturation magnetic flux density, coercivity, and permeability μ'. On the other hand, a comparative example whose a was too large (Comparative Example 6) had a decreased residual magnetic flux density. In a comparative example whose a was too small (Comparative Example 7), a ribbon before a heat treatment was composed of a crystal phase, coercivity after a heat treatment was significantly high, and permeability μ' was significantly low.

Table 4 shows examples where M content (a) and the kind of M were changed.

An example whose each component was in a predetermined range had a favorable constant temperature and humidity test result. Such an example also had favorable saturation magnetic flux density, coercivity, and permeability μ'.

Table 5 shows examples and comparative examples where B content (b) was changed.

An example whose each component was in a predetermined range had a favorable constant temperature and humidity test result. Such an example also had favorable saturation magnetic flux density, coercivity, and permeability μ'. On the other hand, comparative examples whose b was too large (Comparative Examples 8, 8a, 8b, and 8c) had a decreased permeability μ'. Moreover, Comparative Example 8 had a decreased residual magnetic flux density. In a comparative example whose b was too small (Comparative Example 9), a ribbon before a heat treatment was composed of a crystal phase, coercivity after a heat treatment was significantly high, and permeability μ' was significantly low.

Table 6 shows examples and comparative examples where Cu content (e) was changed.

An example whose each component was in a predetermined range had a favorable constant temperature and humidity test result. Such an example also had favorable saturation magnetic flux density, coercivity, and permeability μ'. On the other hand, in a comparative example whose e was too large (Comparative Example 10), a ribbon before a heat treatment was composed of a crystal phase, coercivity after a heat treatment was significantly high, and permeability μ' was significantly low. In a comparative example whose e was too small (Comparative Example 11), coercivity after a heat treatment was high, and permeability μ' was low.

Table 7 shows examples and comparative examples where a Cr content (d) was mainly changed.

An example whose each component was in a predetermined range had a favorable constant temperature and humidity test result. Such an example also had favorable saturation magnetic flux density, coercivity, and permeability μ'. On the other hand, in comparative examples whose d was too large (Comparative Examples 12a and 12b), coercivity after a heat treatment was high, and permeability μ' was low. In a comparative example whose d was too small (Comparative Example 13), corrosion resistance decreased, coercivity after a heat treatment was high, and permeability µ' was low.

In Comparative Example 14 and Examples 18 and 51 to 55 of Table 8, C content (f) was changed.

An example whose each component was in a predetermined range had a favorable constant temperature and humidity test result. Such an example also had favorable saturation magnetic flux density, coercivity, and permeability µ'. An example whose f was within a range of 0.005 to 0.030 had a coercivity of 1.6 A/m or less, which was more favorable. On the other hand, in a comparative example whose f was too large (Comparative Example 14), a ribbon before a heat treatment was composed of a crystal phase, coercivity after a heat treatment was significantly high, and permeability µ' was significantly low.

Examples 56 and 57 of Table 8 are examples whose Fe content was changed with C content (f) of 0.005. Examples 58 and 59 are examples whose Fe content was changed with C content (f) of 0.030. An example whose each component was in a predetermined range had a favorable constant temperature and humidity test result. Such an example also had favorable saturation magnetic flux density, coercivity, and permeability µ'.

Table 9 shows examples where a part of Fe was substituted with X1 and/or X2 with respect to Example 18.

Favorable characteristics were exhibited even if a part of Fe was substituted with X1 and/or X2.

Table 10 shows examples where an average grain size of initial fine crystals and an average grain size of a Fe based nanocrystalline alloy were changed by changing a rotating speed of a roll and/or a heat treatment temperature with respect to Example 18.

Favorable characteristics were exhibited even if an average grain size of initial fine crystals and an average grain size of a Fe based nanocrystalline alloy were changed.

TABLE 11 a to f, α, and β are identical to those of Example 18

| Sample No. | M | XRD | Constant temperature and humidity test 80° C. × 85 RH/h (h) | Bs (T) | Hc (A/m) | µ' (1 kHz) |
|---|---|---|---|---|---|---|
| Example 18 | Nb | amorphous phase | 31 | 1.47 | 2.0 | 49000 |
| Example 23 | Hf | amorphous phase | 32 | 1.52 | 2.2 | 47700 |
| Example 24 | Zr | amorphous phase | 32 | 1.50 | 2.2 | 48200 |
| Example 81 | Ta | amorphous phase | 30 | 1.48 | 2.1 | 47900 |
| Example 82 | Ti | amorphous phase | 29 | 1.47 | 2.0 | 48800 |
| Example 83 | Mo | amorphous phase | 31 | 1.46 | 2.2 | 48000 |
| Example 84 | V | amorphous phase | 30 | 1.47 | 2.1 | 47500 |

Table 11 shows examples carried out in the same conditions as Examples 18, 23, and 24 except that the kind of M was changed.

Favorable characteristics were exhibited even if the kind of M was changed.

The invention claimed is:

1. A soft magnetic alloy comprising a composition having a formula of $((Fe_{(1-(\alpha+\beta))}X1_\alpha X2_\beta)_{(1-(a+b+d+e))}M_a B_b Cr_d Cu_e)_{1-f}C_f$, wherein the atomic fractions of elements in total is one, and wherein:
   X1 is one or more elements selected from a group of Co and Ni,
   X2 is one or more elements selected from a group of W, Al, Mn, Ag, Zn, Sn, As, Sb, Bi, N, O, and rare earth elements,
   M is one or more elements selected from a group of Nb, Hf, Zr, Ta, Ti, Mo, and V, and
   $0.030 \leq a \leq 0.14$,
   $0.028 \leq b \leq 0.15$,
   $0.005 \leq d \leq 0.020$,
   $0 < e \leq 0.030$,
   $0.001 \leq f \leq 0.040$,
   $\alpha \geq 0$,
   $\beta \geq 0$, and
   $0 \leq \alpha+\beta \leq 0.50$ are satisfied, and
   the soft magnetic alloy comprises a nanohetero structure composed of an amorphous phase and initial fine crystals, wherein the initial fine crystals exist in the amorphous phase having an average grain size of 0.3 to 10 nm.

2. The soft magnetic alloy according to claim 1, wherein $0.730 \leq 1-(a+b+d+e) \leq 0.900$ is satisfied.

3. The soft magnetic alloy according to claim 1, wherein $0 \leq \alpha\{1-(a+b+d+e)\}(1-f) \leq 0.40$ is satisfied.

4. The soft magnetic alloy according to claim 1, wherein $\alpha=0$ is satisfied.

5. The soft magnetic alloy according to claim 1, wherein $0 \leq \beta\{1-(a+b+d+e)\}(1-f) \leq 0.030$ is satisfied.

6. The soft magnetic alloy according to claim 1, wherein $\beta=0$ is satisfied.

7. The soft magnetic alloy according to claim 1, wherein $\alpha=\beta=0$ is satisfied.

8. The soft magnetic alloy according to claim 1, comprising a ribbon shape.

9. The soft magnetic alloy according to claim 1, comprising a powder shape.

10. A magnetic device comprising the soft magnetic alloy according to claim 1.

11. A soft magnetic alloy comprising a composition having a formula of $((Fe_{(1-(\alpha+\beta))}X1_\alpha X2_\beta)_{(1-(a+b+d+e))}M_a B_b Cr_d Cu_e)_{1-f}C_f$, wherein the atomic fractions of elements in total is one, and wherein:
   X1 is one or more elements selected from a group of Co and Ni,
   X2 is one or more elements selected from a group of W, Al, Mn, Ag, Zn, Sn, As, Sb, Bi, N, O, and rare earth elements,
   M is one or more elements selected from a group of Nb, Hf, Zr, Ta, Ti, Mo, and V,
   $0.030 \leq a \leq 0.14$,
   $0.028 \leq b \leq 0.15$,
   $0.005 \leq d \leq 0.020$,
   $0 < e \leq 0.030$,
   $0.001 \leq f \leq 0.040$,
   $\alpha \geq 0$,
   $\beta \geq 0$, and
   $0 \leq \alpha+\beta \leq 0.50$ are satisfied, and
   the soft magnetic alloy comprises a structure composed of Fe based nanocrystals with an average grain size of 5-30 nm.

12. The soft magnetic alloy according to claim 11, wherein $0.730 \leq 1-(a+b+d+e) \leq 0.900$ is satisfied.

13. The soft magnetic alloy according to claim 11, wherein $0 \leq \alpha\{1-(a+b+d+e)\}(1-f) \leq 0.40$ is satisfied.

14. The soft magnetic alloy according to claim 11, wherein $\alpha=0$ is satisfied.

15. The soft magnetic alloy according to claim 11, wherein $0 \leq \beta\{1-(a+b+d+e)\}(1-f) \leq 0.030$ is satisfied.

16. The soft magnetic alloy according to claim 11, wherein $\beta=0$ is satisfied.

17. The soft magnetic alloy according to claim 11, wherein $\alpha=\beta=0$ is satisfied.

18. A magnetic device comprising the soft magnetic alloy according to claim 11.

* * * * *